United States Patent [19]
Monaghan et al.

[11] 4,330,172
[45] May 18, 1982

[54] OPTICAL FIBER CONNECTOR HAVING TRANSVERSELY MATEABLE PLUG PORTIONS

[75] Inventors: Kevin J. Monaghan, Middlebury; Russell C. Schwickert, Newtown; John J. Esposito, Bethel, all of Conn.

[73] Assignee: Bunker Ramo Corporation, Oak Brook, Ill.

[21] Appl. No.: 133,530

[22] Filed: Mar. 24, 1980

Related U.S. Application Data

[63] Continuation of Ser. No. 933,927, Aug. 15, 1978, abandoned.

[51] Int. Cl.$^3$ .............................................. G02B 5/172
[52] U.S. Cl. .................................................. 350/96.21
[58] Field of Search ........................... 350/96.20, 96.21

[56] References Cited

U.S. PATENT DOCUMENTS

| | | | |
|---|---|---|---|
| 3,517,981 | 6/1970 | Rueger et al. | 350/96 |
| 3,846,010 | 11/1974 | Love et al. | 350/96 WG |
| 3,861,781 | 1/1975 | Hasegawa et al. | 350/96 C |
| 3,885,859 | 5/1975 | Dalgleish et al. | 350/96 C |
| 3,902,785 | 9/1975 | Matthews | 350/96 C |
| 3,910,678 | 10/1975 | McCartney et al. | 350/96 C |
| 3,914,015 | 10/1975 | McCartney | 350/96 C |
| 3,923,371 | 12/1975 | Dalgleish | 350/96 C |
| 3,936,143 | 2/1976 | Sato | 350/96 C |
| 3,941,485 | 3/1976 | Madden | 356/159 |
| 3,954,338 | 5/1976 | Hennel et al. | 356/138 |
| 3,958,114 | 5/1976 | Codrino | 240/1 LP |
| 3,966,299 | 6/1976 | Osterfield et al. | 350/96 C |
| 3,999,841 | 12/1976 | Dakss et al. | 350/320 |
| 4,009,931 | 3/1977 | Malsby et al. | 350/96 C |
| 4,023,886 | 5/1977 | Nakayama et al. | 350/96 C |
| 4,026,633 | 5/1977 | Crick | 350/96 C |
| 4,029,390 | 6/1977 | Chinnock et al. | 350/96 C |
| 4,030,809 | 6/1977 | Onishi et al. | 350/96 C |
| 4,033,668 | 7/1977 | Presby | 350/96 C |
| 4,046,453 | 9/1977 | Fiebelkorn et al. | 350/96 C |
| 4,047,796 | 9/1977 | Kao et al. | 350/96 C |
| 4,050,783 | 9/1977 | Tardy | 350/96 C |
| 4,056,305 | 11/1977 | McCartney et al. | 350/96 C |
| 4,061,416 | 12/1977 | Stewart | 350/96 C |
| 4,062,624 | 12/1977 | Hammer | 350/96 C |
| 4,074,415 | 2/1978 | Stieff | 29/520 |
| 4,084,308 | 4/1978 | Runge | 29/527.2 |
| 4,087,155 | 5/1978 | Deacon | 350/96.21 |
| 4,090,778 | 5/1978 | Phillips et al. | 350/96.20 |
| 4,101,198 | 7/1978 | Heldt | 350/96.20 |
| 4,113,346 | 9/1978 | Jackson et al. | 350/96.20 |
| 4,133,601 | 1/1979 | Le Guen et al. | 350/96.21 |
| 4,139,260 | 2/1979 | Bouygues et al. | 350/96.22 |
| 4,142,776 | 3/1979 | Cherin et al. | 350/96.21 |
| 4,146,299 | 3/1979 | Wellington et al. | 350/96.21 |
| 4,155,624 | 5/1979 | Logan et al. | 350/96.21 |
| 4,158,477 | 6/1979 | Phillips et al. | 350/96.21 |
| 4,186,997 | 2/1980 | Schmacher | 350/96.21 |

FOREIGN PATENT DOCUMENTS

| | | |
|---|---|---|
| OS2522804 | 12/1976 | Fed. Rep. of Germany. |
| 2748503 | 8/1978 | Fed. Rep. of Germany. |
| 2175547 | 10/1973 | France. |
| 2308115 | 11/1976 | France ........................ 350/96.20 |
| 2385107 | 10/1978 | France. |
| 2386829 | 11/1978 | France. |
| 2389148 | 11/1978 | France. |
| 1425264 | 2/1976 | United Kingdom ............ 350/96.20 |
| 1479575 | 7/1977 | United Kingdom. |
| 1486681 | 9/1977 | United Kingdom. |

OTHER PUBLICATIONS

"Separable Connector Development for Duplex Fiber Optic Cable", by Robert F. Evans, Berg Electronics Division, E. I. DuPont De Nemour and Company, Inc.
"Fiber Optic Connector Designed to Eliminate Tolerance Effects", by William L. Schumacher, AMP Incorporated, Harrisburg, PA.

*Primary Examiner*—John K. Corbin
*Assistant Examiner*—Frank Gonzalez
*Attorney, Agent, or Firm*—N. A. Camasto; J. R. Hoffman

[57] ABSTRACT

A separable in-line fiber optic connector adapted for coupling a pair of optical fibers or a single optical fiber and a light source or detector. The fiber connector includes a terminal plug member having a through hole extending axially therethrough for receiving an optical fiber. The plug member is axially split so as to comprise first and second separate longitudinal portions defining the through hole which are transversely matable for clamping the optical fiber therebetween. The plug portions are interengageable in a manner preventing any relative axial displacement therebetween. A housing member receives the terminal plug member and confines the split portions to a mating position in which they firmly clamp the optical fiber. The separate longitudinal plug portions are transversely ribbed along at least an axial section of the through hole for engaging the optical fiber to prevent axial displacement thereof. The housing and the plug member can be angularly related to provide for polarized interengagement thereof. A detent notch and protrusion structure can also be provided between the housing and the plug member for snap fitting of the plug member into the housing. Additionally, one of the plug portions of the plug members extends from one end of the through hole to the other and is provided with a forward mating face extending entirely across the plug member to define a terminal end therefor.

20 Claims, 7 Drawing Figures

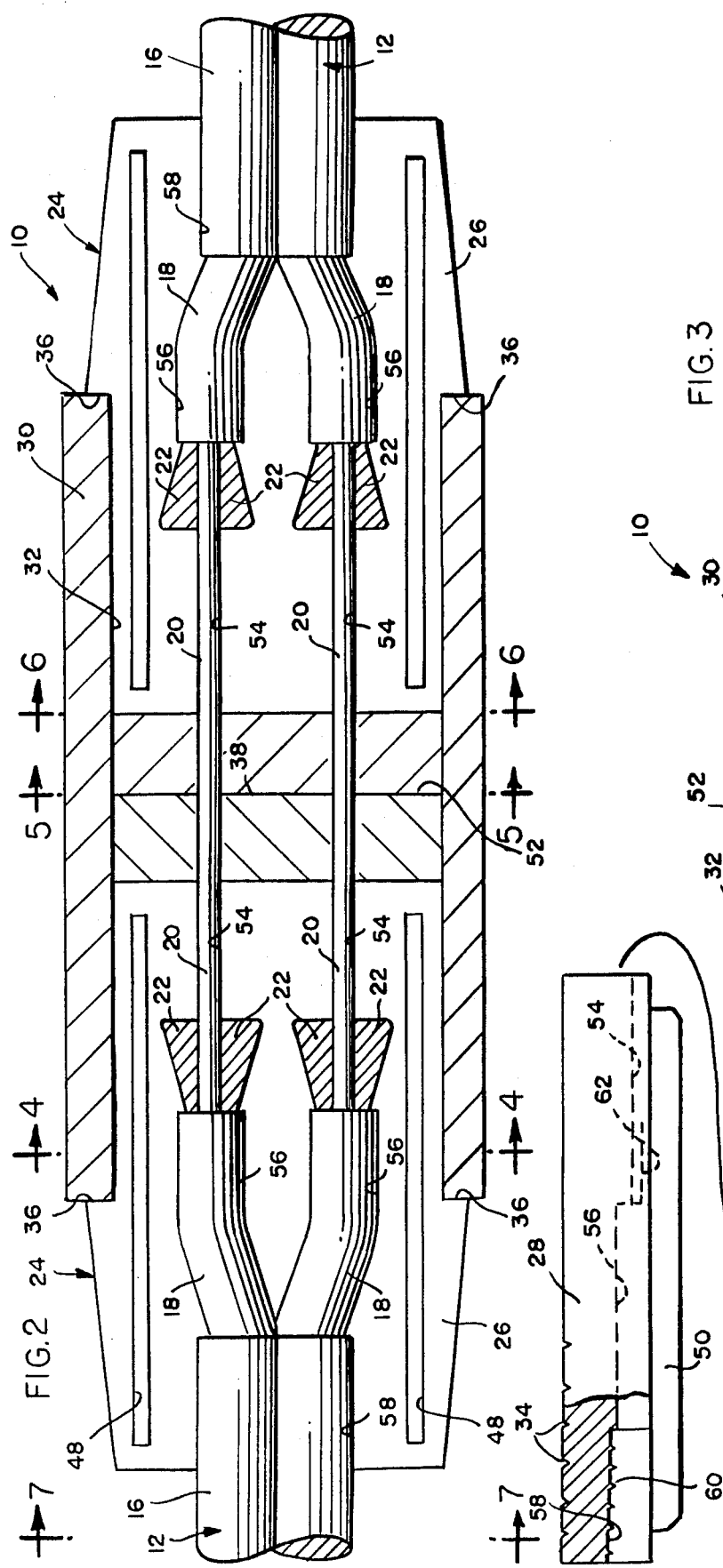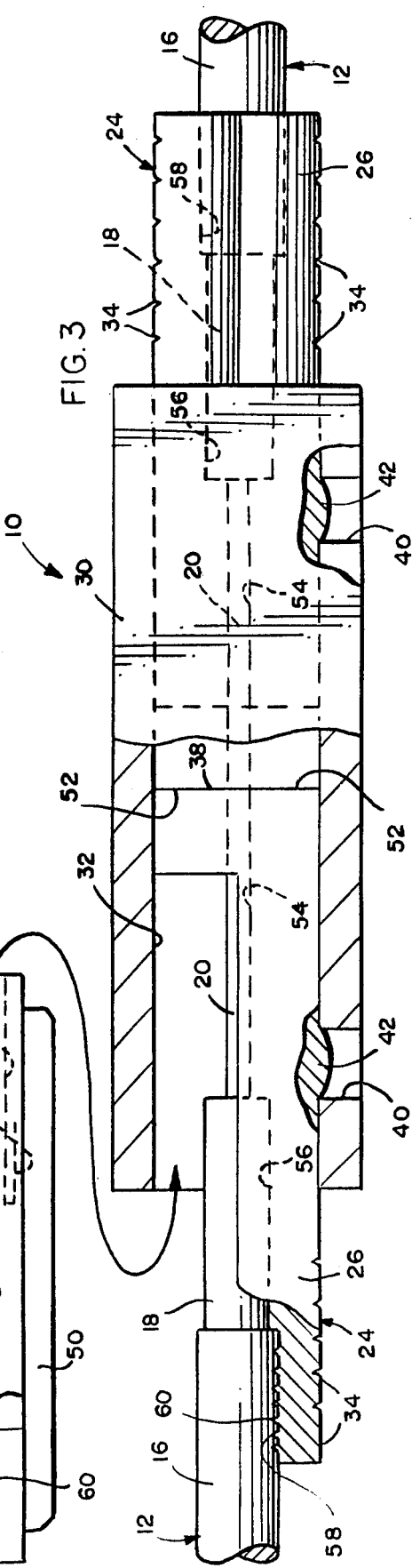

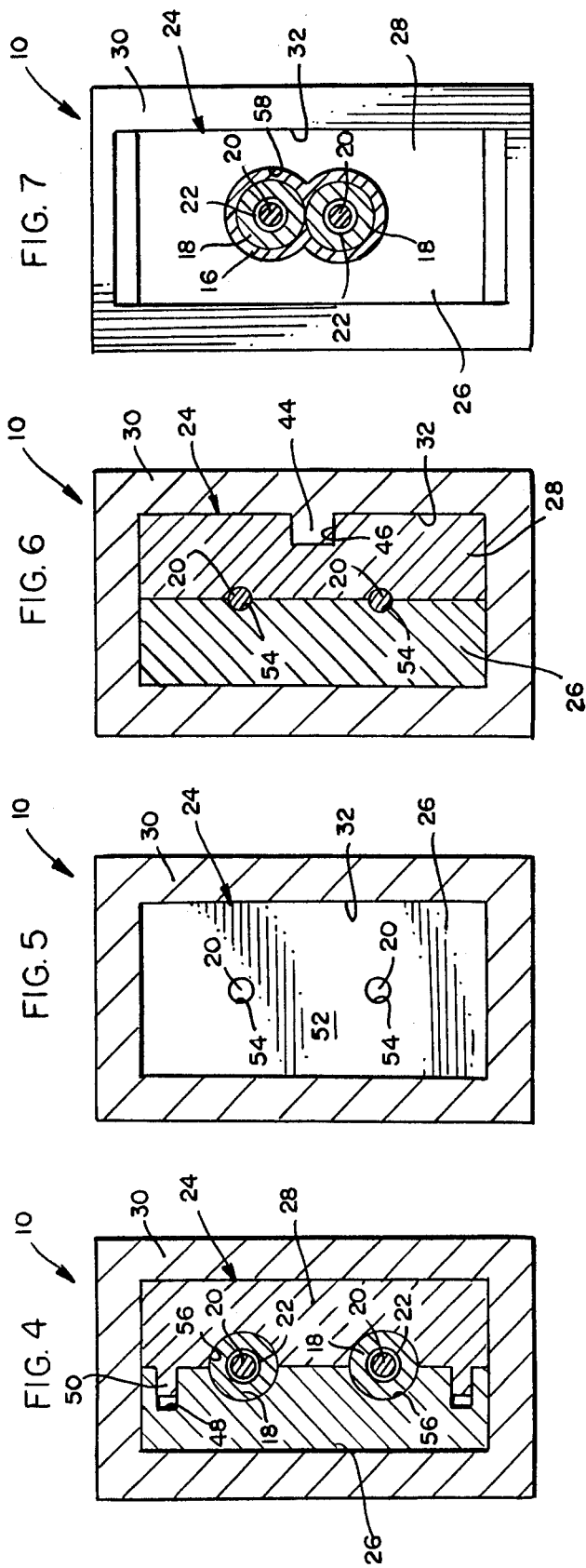

OPTICAL FIBER CONNECTOR HAVING TRANSVERSELY MATEABLE PLUG PORTIONS

This is a continuation, application of application Ser. No. 933,927, filed Aug. 15, 1978, now abandoned.

BACKGROUND OF THE INVENTION

This invention relates generally to fiber optic connectors and, more specifically, to a separable in-line fiber optic connector for coupling fiber optic components such as a pair of optical fibers or a single optical fiber and a light source or detector. The terminal end surface of an optical fiber for use in light wave transmission must be flat and highly polished to minimize insertion losses. The optical fibers typically must also be axially, laterally, and angularly aligned within certain parameters to establish an excellent optical coupling between two optical fibers. The success achieved in the development and production of optical fibers has therefore focused strongly upon connectors and couplers for such fibers including in-line connectors. The ability to design, manufacture, deploy and service a data transmission line, for instance, requires suitable connectors in order to assure the continued progress of the fiber optics field. Accordingly, connectors for this and other applications typically capable of plural mate/unmate cycles must be developed which can be used without any significant increase in insertion losses.

Many fiber optic connectors presently available are precision, expensive instruments providing very low insertion losses but they are not designed for repeated connection, disconnection, or servicing by untrained field personnel. This is particularly true in long distance applications such as telephonic systems and in other applications requiring extremely low insertion losses where expensive low loss connectors may be employed. It has been found, however, that expensive low loss connectors are not always well suited for applications requiring a large number of connectors which need not achieve the same level of low insertion losses. For instance, in such applications as computers and other data transmission applications, a large number of relative short lengths of optical fibers are employed. In such applications, it would be preferable to terminate the optical fibers with connectors which suitably are capable of plural mate/unmate cycles for servicing in the field. Accordingly, there is a need for an improved low cost connector of the character described.

SUMMARY OF THE INVENTION

Accordingly, a principal object of the present invention is to provide a new and improved low cost, separable inline fiber optic connector adapted for coupling fiber optic components such as a pair of optical fibers or a single optical fiber and a light source or detector.

The structure of the fiber optic connector of the present invention is designed to include cooperating features in furtherance of this object.

The fiber optic connector of the present invention includes a terminal plug member having a through hole extending axially therethrough for receiving an optical fiber. The plug member is axially split so as to comprise first and second separate longitudinal portions defining the through hole which are transversely matable for clamping the optical fiber therebetween. A housing is provided for receiving the terminal plug member and confining the split portions thereof to their mating position in which they firmly clamp the optical fiber. The plug member includes at least one of the longitudinal plug portions being transversely ribbed along at least an axial section of the through hole for engaging the optical fiber to prevent axial displacement thereof. Interengaging means are provided between the two plug portions for preventing axial displacement therebetween.

As shown herein, the fiber optic connector is adapted for receiving an optical fiber having an insulating layer or jacket comprising a thermoplastic coating. The through hole includes a first portion having a relatively large inner diameter substantially equal to the outer diameter of the jacket of the optical fiber extending axially from one end of the plug member, a second portion having a relatively small diameter substantially equal to the diameter of the optical fiber itself extending axially from the other end of the plug member, and a third portion generally at the juncture of the first and second portions and sized to receive strength members disposed between the optical fiber and the outer jacket. Accordingly, the through hole advantageously includes three distinct portions sized and shaped to accommodate the optical fiber.

Complementary angular aligning means may advantageously be provided between the housing and one of the longitudinal plug portions for polarization of the connector. The aligning means comprises an axial interior groove formed in either the housing or the plug portion with a protrusion being formed on the other of the housing and the plug portion axially positionable in the groove.

Detent means are also advantageously provided between the housing and the plug member for holding the plug member axially within the housing. The detent means comprises a detent notch in either the housing or the plug member with a detent protrusion in the other of the housing and the plug member for snap fitting into the detent notch.

One of the plug portions of the split plug member advantageously extends from an outer end of the through hole to an inner end thereof. It is provided at the inner end thereof with a mating face defining a terminal end of the plug member. Preferably, the mating face extends entirely across the terminal end of the plug member.

In one form of the invention disclosed herein, a pair of aforementioned plug members are provided and the housing is in the form of a sleeve. The housing is then axially dimensioned so that the sleeve receives both plug members in mated position. Advantageously, the sleeve and each of the plug members have complementary angular aligning means providing for polarized engagement of the plug members with the housing and complementary detent elements for axially holding the opposing plug members within the housing so that the terminal ends of the optical fibers are in axial, lateral and angular alignment. The distance between the two detent elements of the two plug members and the axial dimensions between the corresponding detent elements of the housing can be varied to control end separation of corresponding ones of the optical fibers. The plug members and the housing can be fabricated of elastomeric materials for low cost manufacture but reliable production and functional use.

The present invention is therefore directed to a separable, in-line fiber optic connector adapted for coupling fiber optic components such as a pair of optical fibers or a single optical fiber and a light source or detector. It is among the objects of the present invention to provide a connector which is capable of plural mate/unmate cycles for servicing in the field by untrained field personnel in an industrial environment wherein the connector can be molded from a number of different thermoplastics in order to be compatible with existing electrical and optical components. Still other objects and advantages of the present invention will be appreciated from a consideration of the details of construction and operation set forth in the accompanying specifications, claims and drawings.

DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures in which:

FIG. 2 is a central sectional view, on an enlarged scale, of the optical fiber connector as embodied for use with duplex fiber and including a pair of identical plug members coupled in line within a housing;

FIG. 3 is a fragmented vertical section of FIG. 2, with one portion of the plug member removed and shown separately to facilitate the illustration;

FIG. 4 is a vertical section taken generally along line 4—4 of FIG. 2;

FIG. 5 is a vertical section taken generally along line 5—5 of FIG. 2;

FIG. 6 is a vertical section taken generally along line 6—6 of FIG. 2; and

FIG. 7 is an end elevational view taken generally in the direction of arrows 7—7 of FIG. 2, with a section through the optical cable.

DETAILED DESCRIPTION OF THE PREFERRED EMBODIMENTS

Figure 1:
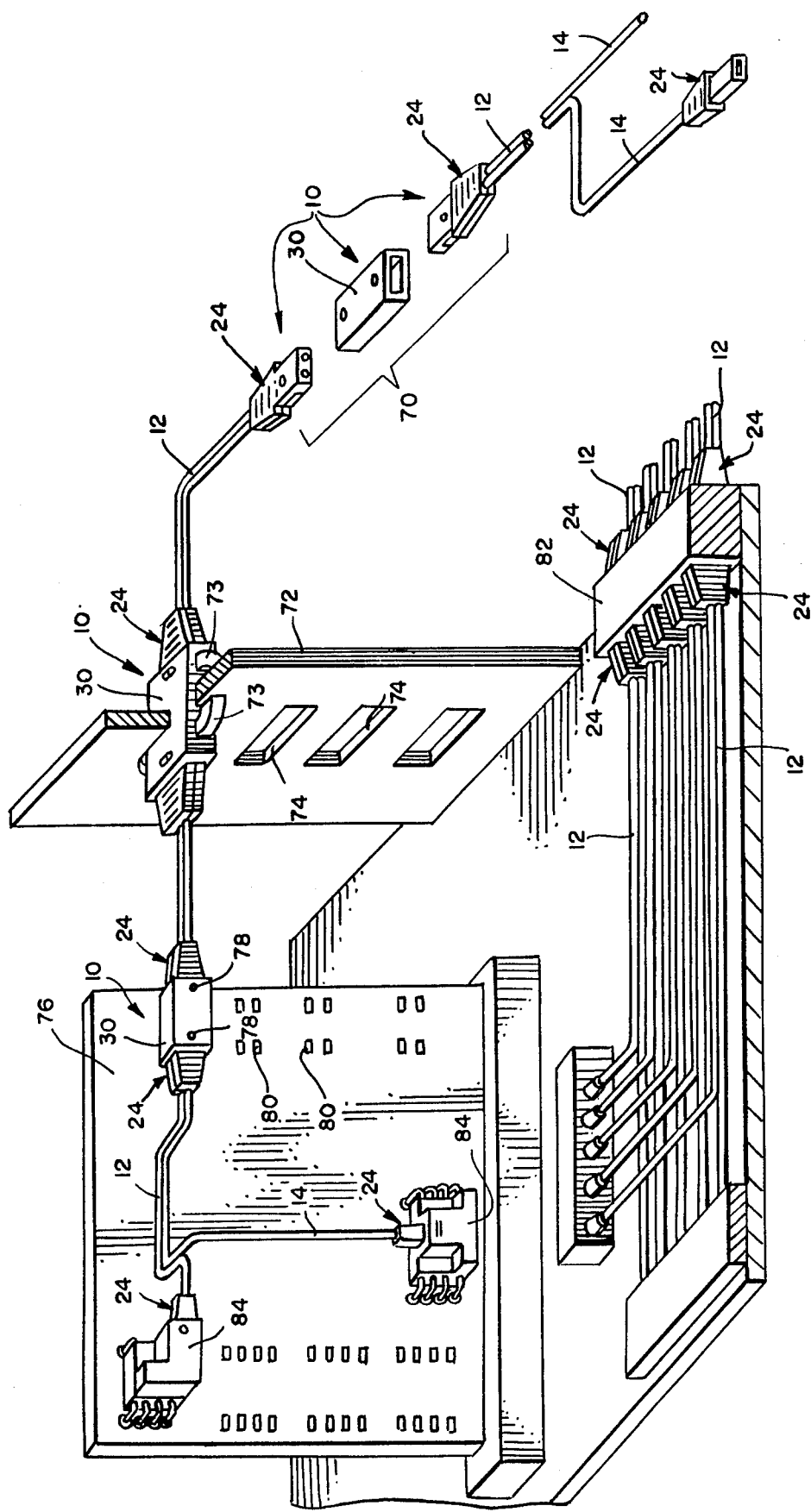
FIG. 1 shows a perspective view of the optical fiber connector of the present invention adapted for use in various applications.

Referring to FIG. 1 of the drawings in greater detail, several embodiments of the fiber optic connector, generally designated 10, are shown for coupling fiber optic components such as a pair of optical fibers or a single optical fiber and a light source or detector. As shown in FIGS. 2-7 of the drawings, the fiber optic connector is employed with a duplex cable 12. However, as shown in the bottom right-hand corner of FIG. 1, the fiber optic cable may comprise a single fiber cable 14 for use with the connector of the present invention. As seen in FIG. 2, the duplex cable 12 has an outer insulating layer or jacket 16 of thermoplastic material. Each individual optical fiber 20 of the duplex cable 12 also has an inner insulating layer or jacket 18 of thermoplastic material. As shown in the drawings, the outer jacket 16 and the inner jackets 18 are trimmed so that the inner jackets 18 extend beyond the outer jacket 16 and the optical fibers 20 extend beyond the corresponding inner jackets 18 to form the terminal end of the fiber optic cable 12. Strength members 22 are provided between the inner jackets 18 and the corresponding optical fibers 20 and are exposed in a flared fashion as shown in FIG. 2.

FIG. 2 shows the fiber optic connector 10 of the present invention as embodied for coupling a pair of fiber optic cables 12 in opposed in-line relationship. The connector 10 aligns the corresponding optical fibers 20 of the cables 12 to provide low insertion losses by minimizing axial, lateral, or angular misalignment. However, the advantages and features of the fiber optic connector 10 of the present invention are equally applicable for coupling a single fiber optic cable 12 to a light source or detector as described in more detail hereinafter.

Referring to FIGS. 2 through 7 in greater detail, the fiber optic connector 10 of the present invention includes one or more terminal plug members, generally designated 24, depending on the application for the connector 10. Each plug member 24 is axially split so as to comprise a first longitudinal plug portion 26 and a second longitudinal plug portion 28 which are shown as the lower and upper plug portions as viewed in FIG. 3. The plug portions 26, 28 are transversely mateable to define a contoured through hole therebetween extending axially through the terminal plug member 24 to clamp the fiber optic cable 12 and the optical fibers 20 within the through hole as described hereinafter.

A housing 30 is provided generally in the form of a rectangular sleeve which receives the plug members 24 to hold them in axial alignment and to confine the split plug portions 26, 28 to a mating position in which they firmly clamp the fiber optic cables 12. The outside of the plug members 24 are generally rectangularly shaped for insertion within the interior rectangular receiving hole or receptable extending entirely through the housing 30 from end to end. The outside of the plug members 24 on the split portions 26, 28 thereof may be ribbed as at 34 (as shown in FIG. 3) at the outer exposed ends thereof to facilitate grasping during insertion and removal of the plug members into and out of the housing 30. The plug members 24 also include shoulders 36 which abut against the ends of the housing 30 to limit the travel of the plug members into the housing. Accordingly, although the terminal ends of the plug members 24 are shown abutting at 38 in FIGS. 2 and 3, the terminal ends, if desired, can be slightly spaced from each other at the mated ends thereof to prevent scratching of the aligned optical fibers 20 when in a fully mated position.

Complementarily engageable detent means are provided between each of the plug members 24 and the housing 30 for releasably holding the plug members axially within the housing. Referring to FIG. 3, the detent means comprises a bore 40 through the housing 30 communicating with each of the plug members 24 and a radially protruding detent projection or boss 42 formed on the lower split portion 26 of each of the plug members. Referring to FIGS. 2 and 3, the distance between the detent holes 40 in the housing 30 can be slightly smaller than the cumulative dimension between the center lines of the detent bosses 42. When coupling a pair of plug members 24 and their respective fiber optic cables 12 in an in-line relationship with this feature, the shoulders 36 are located so as to permit the plug members 24 to be driven or biased towards each other to minimize end separation between corresponding ones of the optical fibers 20 within the housing 30.

Means are provided between the plug members 24 and the housing 30 to angularly relate the components so as to provide polarized interengagement thereof particularly for use with duplex cables 12 or multiple fiber bundles. More particularly, referring to FIG. 6, an inwardly protruding axial rib 44 is formed on the inside of the housing 30 and an axial groove 46 is formed on the outside of the plug member 24 for receiving the rib 44 so that the plug member can be inserted into the housing only in a predetermined angular orientation. The groove 46 may be formed on either of the plug portions 26, 28 of the plug member 24 depending upon the design and desired orientation of the plug member.

As stated above, each plug member 24 is comprised of first and second plug portions 26, 28 (the lower and upper plug portions, respectively, as illustrated in FIG. 3). Axial interengaging means are provided between the plug portions 26, 28 for preventing axial displacement therebetween. This means includes a pair of axially extending grooves 48 (as shown in FIG. 2) along the inner face of the plug portion 26 and a pair of protruding axially extending ribs 50 on the corresponding inner face of the plug portion 28. In assembling the plug portions 26, 28 to sandwich a fiber optic cable 12 therebetween, the plug portion 26 simply is assembled in a lateral, i.e., transverse, direction positioning the ribs 50 of the plug portion 28 into the grooves 48 of the plug portion 26 to clamp the fiber optic cable 12 therebetween.

After the plug members 24 have been assembled, they are then inserted axially into the housing 30 as described hereinabove. The plug portion 26 of each of the plug members 24 is longer than the corresponding plug portion 28 (as shown in FIG. 3) and is dimensioned at its terminal end to extend across the terminal end of the plug portion 28 so as to substantially conform to the size and shape of the inside of the housing 30. Thus, the plug portion 26 has a single continuous mating face 52 extending entirely across the plug member 24 at the terminal end thereof which is opposite the corresponding mating face 52 of the other mated plug member 24 when fully mated (as shown in FIGS. 2 or 3) or which is opposite a light source or detector when using a single plug member 24. Moreover, the non-segmented mating faces 52 of the plug members 24 assure proper mating of the plug members by entirely eliminating one source of alignment error which would otherwise exist. The relative dimensioning between the detent holes 40 of the housing 30 and the detent bosses 42 of the plug members 24 as well as the shoulders 36 of the plug members 24 as described above are effective to control the spacing, if any, between the mating faces 52 of the opposing plug members 24. Preferably, the optical fibers 20, after being assembled or clamped between the plug portions 26, 28 are trimmed so as to be flush with the mating face 52 of their respective plug members 24.

As mentioned above, the through hole extending axially through each plug member 24 is contoured for receiving the components of the fiber optic cable such as the duplex cable 12. More particularly, with the duplex cable 12 (as shown in FIG. 2) the composite through hole includes a small diameter portion 54 for each optical fiber 20 and a relatively larger diameter portion 56 for receiving the inner jacket 18 of each optical fiber 20. Furthermore, the composite through hole includes a still larger portion 58 for receiving the integral outer jacket or sheath 16 of the duplex cable 12. Moreover, the interior of the through hole portion 58, including that which extends through both of the plug portions 26, 28, is interiorly ribbed as at 60 (as shown in FIG. 3) to facilitate gripping engagement of the duplex cable 12 by the plug member 24. Referring to FIG. 3, the through hole of each plug member 24 also includes a flared portion 62 formed in the plug portion 28 at the juncture between the through hole portions 54 and 56 for accommodating strength members 22.

The housing 30 and the plug portions 26, 28 of each of the plug members 24 may be fabricated of thermoplastic material for ease of manufacture and assembly while yet providing a reliable, low loss, fiber optic connector which is relatively inexpensive to manufacture. The connector and the novel features thereof are readily adaptable for a wide variety of in-line applications as illustrated in FIG. 1. For instance, the connector shown in FIGS. 2 through 7 may be used for a "flying splice" 70 and, with slight modifications for mounting, as a bulkhead connector secured to a panel 72 through an aperture 74 by means of snap fingers 73 molded integrally along the sides of the housing 30. Similarly, the connector can be secured to a printed circuit board 76 (FIG. 1) by means of bosses 78 molded integrally with the housing 30 for snap fit within holes 80 in the circuit board 76. The connector can also be utilized with the housing 30 fabricated as at 82 (FIG. 1) to provide an expandable section for use with multiple individual plug members 24. In addition, the connector 10 can be adapted for in-line use with other fiber optic components such as a light source or a light detector used in input/output connector applications by use of complementary housings 84 (FIG. 1) housing the light source or detector and having a plug receiving opening similar to the receiving hole of housing 30.

With the present invention, it is possible to use a split design with the through hole contours molded into the plug member to accept the optical fiber, the inner jacket, the strength members, and the outer jacket. The strength members are retained by captivating them between the longitudinal plug portions as they are bonded together. It has been found that in addition to the traditional epoxy bonding techniques, the connector's design lends itself to ultrasonic welding of the plug portions by selecting and using suitable thermoplastics as the material for molding the connector elements. The connector design allows the optical fibers to be terminated by either polishing the fiber ends or cutting the fiber ends such as with a razor blade, when using plastic optical fibers. It has been found that providing a single continuous mating face which is not segmented at the terminal end of the plug member facilitates termination of the optical fibers as well as eliminating one common source of alignment error. The non-segmented surface at which the optical fibers terminate also eliminate the possibility of overlap of the plug portions which might otherwise be caused by deviations from acceptable manufacturing tolerances or possible assembly errors. Although particularly well suited for duplex fiber optic cable, the connector of the present invention can easily be modified to handle single channel fiber optic cables, multichannel fiber optic cables and planar arrays, i.e., ribbon fiber optic cables, of any number of channels, by forming the through hole or holes to conform to such cable in a manner that will readily be appreciated by those skilled in the art.

While in the foregoing specification a detailed description of the invention has been set forth for purposes of illustration, variation of the details herein given may be made by those skilled in the art without departing from the spirit and scope of this invention.

We claim:

1. A connector for coupling an optical fiber to a fiber optic component comprising:

plug means comprising first and second transversely mateable plug portions for holding said optical fiber therebetween, said first plug portion including a forward end having a continuous forwardly facing mating surface extending in front of said second plug portion, said optical fiber extending through said forward end of said first plug portion to said continuous forwardly facing mating surface; and housing means mounting said fiber optic component and including a receptacle for receiving said plug means with said continuous forwardly facing mating surface thereof positioned to optically couple said optical fiber and said fiber optic component.

2. A connector in accordance with claim 1 including means for biasing said continuous forwardly facing mating surface of said plug means toward abutting relation with said fiber optic component.

3. A connector in accordance with claim 2 wherein said biasing means releasably holds said plug means in said receptacle.

4. A connector in accordance with claim 3 wherein said biasing means includes a detent hole in one of said plug means or said housing means and a detent boss on the other one of said plug means or said housing means for engaging said detent hole.

5. A connector in accordance with claim 4 wherein the distance between said detent hole and said fiber optic component is less than the distance between said detent boss and said fiber optic component, the difference in said distances being sufficient to bias said continuous forwardly facing mating surface against said fiber optic component while releasably holding said plug means in said receptacle.

6. A connector in accordance with claim 3 including means for limiting the travel of said plug means into said receptacle.

7. A connector in accordance with claim 6 wherein said travel limiting means includes at least one shoulder on said plug means for engaging said housing means.

8. A connector in accordance with claim 1 including means for preventing axial displacement between said first and second plug portions.

9. A connector in accordance with claim 8 wherein said axial displacement preventing means includes at least one groove in one of said plug portions and at least one complementary rib on the other one of said plug portions, said rib engaging said groove to prevent axial displacement between said first and second plug portions.

10. A connector in accordance with claim 1 wherein each of said plug portions as a transversely mateable surface, each of said transversely mateable surfaces having a groove therein, said grooves combining to provide an axial hole through said plug means when said plug portions are mated, said hole further extending through said forward end of said first plug portion to said continuous forwardly facing mating surface, said optical fiber residing in said hole when said plug portions are mated.

11. A connector for coupling a pair of optical fibers comprising:

a pair of plug members, each of said plug members having a through hole extending axially therethrough for receiving one of said optical fibers, each of said plug members being axially split so as to comprise first and second separate longitudinal portions defining said through hole thereof and being transversely mateable for clamping said optical fiber therebetween, each of said plug members presenting a single, continuous forwardly facing mating face defined by one of said longitudinal plug portions thereof; and a housing member in the form of a sleeve for receiving said plug members.

12. A connector in accordance with claim 11 wherein each of said optical fibers is disposed within a fiber optic cable, said fiber optic cables each including an outer insulating jacket, strength members disposed within said outer insulating jacket, and said optical fiber disposed within said strength members, each of said optical fibers further being disposed within an inner insulating jacket.

13. A connector in accordance with claim 12 wherein said through hole of each of said plug members includes a small diameter portion for accommodating one of said optical fibers, a relatively larger diameter portion for accommodating said inner insulating jacket of said optical fiber, and a still larger diameter portion for accommodating said outer insulating jacket of said fiber optic cable containing said optical fiber.

14. A connector in accordance with claim 13 wherein said through hole of each of said plug members further includes a flared portion for accommodating said strength members of one of said fiber optic cables.

15. A connector in accordance with claim 11 including means for holding said plug members axially within said housing, said holding means including complementarily engageable detent means between said housing and said plug members.

16. A connector in accordance with claim 15 wherein said detent means includes a pair of detent notches and a pair of detent protrusions, said detent notches being formed in either said housing or said plug members and said detent protrusions being formed in the other of said housing or said plug members, said detent protrusions being adapted for snap fitting into said detent notches.

17. A connector in accordance with claim 11 wherein said housing and said plug members have complementary angular aligning means providing for polarized inner engagement thereof.

18. A connector in accordance with claim 17 wherein one of said housing and said plug members has an axial interior groove and the other of said housing and said plug members has a protrusion axially positionable in said groove.

19. A connector for coupling an optical fiber to a fiber optic component comprising:

a plug member comprising first and second transversely mateable plug portions defining a through hole therebetween for holding said optical fiber, said first plug portion including a forward end having a continuous forwardly facing surface extending in front of said second plug portion and said optical fiber extending through said forward end of said first plug portion in said through hole to said continuous forwardly facing surface; and housing means for mounting said fiber optic component and for receiving said plug member with said continuous forwardly facing surface positioned to optically couple said optical fiber and said fiber optic component.

20. A connector in accordance with claim 19 wherein said housing means includes a receptacle having a cross-sectional configuration for receiving said plug member, and wherein said continuous forwardly facing surface of said first plug portion conforms to said cross-sectional configuration.

* * * * *